(12) United States Patent
Hewitt et al.

(10) Patent No.: US 10,771,414 B2
(45) Date of Patent: Sep. 8, 2020

(54) AUTHENTICATION IN MESSAGING PLATFORMS FOR WEB CONTENT

(71) Applicant: INTERNATIONAL BUSINESS MACHINES CORPORATION, Armonk, NY (US)

(72) Inventors: Trudy L. Hewitt, Cary, NC (US); John Rice, Tramore (IE); Liam S. Harpur, Dublin (IE); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 16/019,610

(22) Filed: Jun. 27, 2018

(65) Prior Publication Data
US 2020/0007480 A1 Jan. 2, 2020

(51) Int. Cl.
G06F 15/16 (2006.01)
H04L 12/58 (2006.01)
H04L 29/06 (2006.01)
G06Q 30/02 (2012.01)

(52) U.S. Cl.
CPC ....... H04L 51/063 (2013.01); G06Q 30/0251 (2013.01); H04L 51/22 (2013.01); H04L 63/0807 (2013.01)

(58) Field of Classification Search
CPC ... H04L 51/063; H04L 51/22; H04L 63/0807; G06Q 30/0251
USPC ......................................... 709/206, 225, 226
See application file for complete search history.

(56) References Cited

U.S. PATENT DOCUMENTS

| 9,116,944 | B1 | 8/2015 | Emigh |
| 9,294,479 | B1 * | 3/2016 | Koulomzin ......... H04L 63/0884 |
| 9,298,896 | B2 | 3/2016 | Pieczul et al. |
| 9,344,449 | B2 | 5/2016 | Brown et al. |
| 9,794,240 | B2 | 10/2017 | Liu et al. |
| 9,881,145 | B2 | 1/2018 | Dusad et al. |
| 10,135,808 | B1 * | 11/2018 | Wasiq ................... H04L 63/102 |

(Continued)

OTHER PUBLICATIONS

Mell, et al., "The NIST Definition of Cloud Computing," National Institute of Standards and Technology, U.S. Department of Commerce, Special Publication 800-145, Sep. 2011, pp. 1-7.

(Continued)

*Primary Examiner* — Liang Che A Wang
(74) *Attorney, Agent, or Firm* — Kenneth Han

(57) ABSTRACT

A method, computer system, and computer program product for authenticating a user in messaging platforms for web content are provided. The embodiment may include ingesting a plurality of electronic messages from a user account. The embodiment may also include identifying a user-targeted marketing link within the plurality of electronic messages. The embodiment may further include identifying a messaging ID associated with the user account. The embodiment may also include verifying the messaging ID associated with the user is correct based on the plurality of electronic messages. The embodiment may further include transmitting a modified electronic message to the electronic mailbox associated with the user that includes a personalized token in a uniform resource locator (URL). The embodiment may also include in response to user interaction with the URL, processing the URL to provide access to promotional content.

20 Claims, 6 Drawing Sheets

(56) References Cited

U.S. PATENT DOCUMENTS

| | | | |
|---|---|---|---|
| 10,419,448 B2* | 9/2019 | Parthasarathy | H04L 51/08 |
| 2014/0137192 A1 | 5/2014 | Arroyo-Figueroa | |
| 2015/0020178 A1 | 1/2015 | Grunin et al. | |
| 2015/0178819 A1 | 6/2015 | Kassemi et al. | |
| 2015/0207660 A1 | 7/2015 | Sundaram et al. | |
| 2015/0312313 A1 | 10/2015 | Whitt | |
| 2016/0127710 A1* | 5/2016 | Saban | G02B 5/08 |
| | | | 386/241 |
| 2016/0358174 A1* | 12/2016 | Kassemi | H04L 67/02 |
| 2017/0149782 A1 | 5/2017 | Bender et al. | |
| 2017/0222996 A1* | 8/2017 | Adams | H04L 63/0846 |
| 2018/0033076 A1* | 2/2018 | Roundtree | G06K 3/00 |
| 2018/0041633 A1* | 2/2018 | Velthuis | H04M 3/42382 |
| 2018/0157468 A1* | 6/2018 | Stachura | G06F 8/38 |
| 2018/0198799 A1* | 7/2018 | Parthasarathy | H04L 63/123 |

OTHER PUBLICATIONS

Liu et al., "Measuring the Insecurity of Mobile Deep Links of Android", 26th USENIX Security Sympoisum, Aug. 16-18, 2017, pp. 1-17.

Kleedorfer et al., "Verifiability and Traceability in a Linked Data Based Messaging System", 12th International Conference on SEMANTICS '16 ACM, Sep. 12-15, 2016, pp. 97-100.

Su et al., "Haggle: Clean-Slate Networking for Mobile Devices", University of Cambridge, Technical Report, No. 680, Jan. 2007, pp. 1-30.

Offutt et al., "Bypass Testing of Web Applications", 15th International Symposium on ISSRE IEEE, Nov. 2-5, 2004, pp. 1-11.

Thomas, "What is a Personal URL?", Purlem, http://whatispersonalurl.com/, printed on May 17, 2018, pp. 1-6.

Neely, "How to use UTM codes to track the success of your email marketing", Blog—Email Marketing, campaign Monitor, https://www.campaignmonitor.com/blog/email-marketing/2015/07/utm-codes-in-email/, Jul. 30, 2015, pp. 1-13.

Hubspot, "How to create a tracking URL for a landing p.", HubSpot Academy, last updated Nov. 17, 2017, https://knowledge.hubspot.com/landing-page-user-guide-v2/how-to-create-a-tracking-url-for-a-landing-page, pages 1-15.

Kukic, "Cookies vs Tokens: The Definitive Guide", Blog, May 31, 2016, https://auth0.com/blog/cookies-vs-tokens-definitive-guide/, pp. 1-24.

* cited by examiner

AUTHENTICATION IN MESSAGING PLATFORMS FOR WEB CONTENT

BACKGROUND

The present invention relates, generally, to the field of computing, and more particularly to messaging platforms and authentication systems.

Authentication may relate to establishing the identity of a user for another user or an information system. Typically, a user identity is provided to an information system and the information system must confirm the user identity. If an authentication process is completed, a user is authorized for further actions such as making payments for purchases, editing personal information or editing important documents. A user's identity can be proven by various forms of information, such as a password, a username, an electronic signature, an email address or personal data including gender, address, and phone number, etc.

SUMMARY

According to one embodiment, a method, computer system, and computer program product for authenticating a user in messaging platforms for web content are provided. The embodiment may include ingesting a plurality of electronic messages from a user account. The embodiment may also include identifying a user-targeted marketing link within the plurality of electronic messages. The embodiment may further include identifying a messaging ID associated with the user account. The embodiment may also include verifying the messaging ID associated with the user is correct based on the plurality of electronic messages. The embodiment may further include transmitting a modified electronic message to the electronic mailbox associated with the user that includes a personalized token in a uniform resource locator (URL). The embodiment may also include in response to user interaction with the URL, processing the URL to provide access to promotional content.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
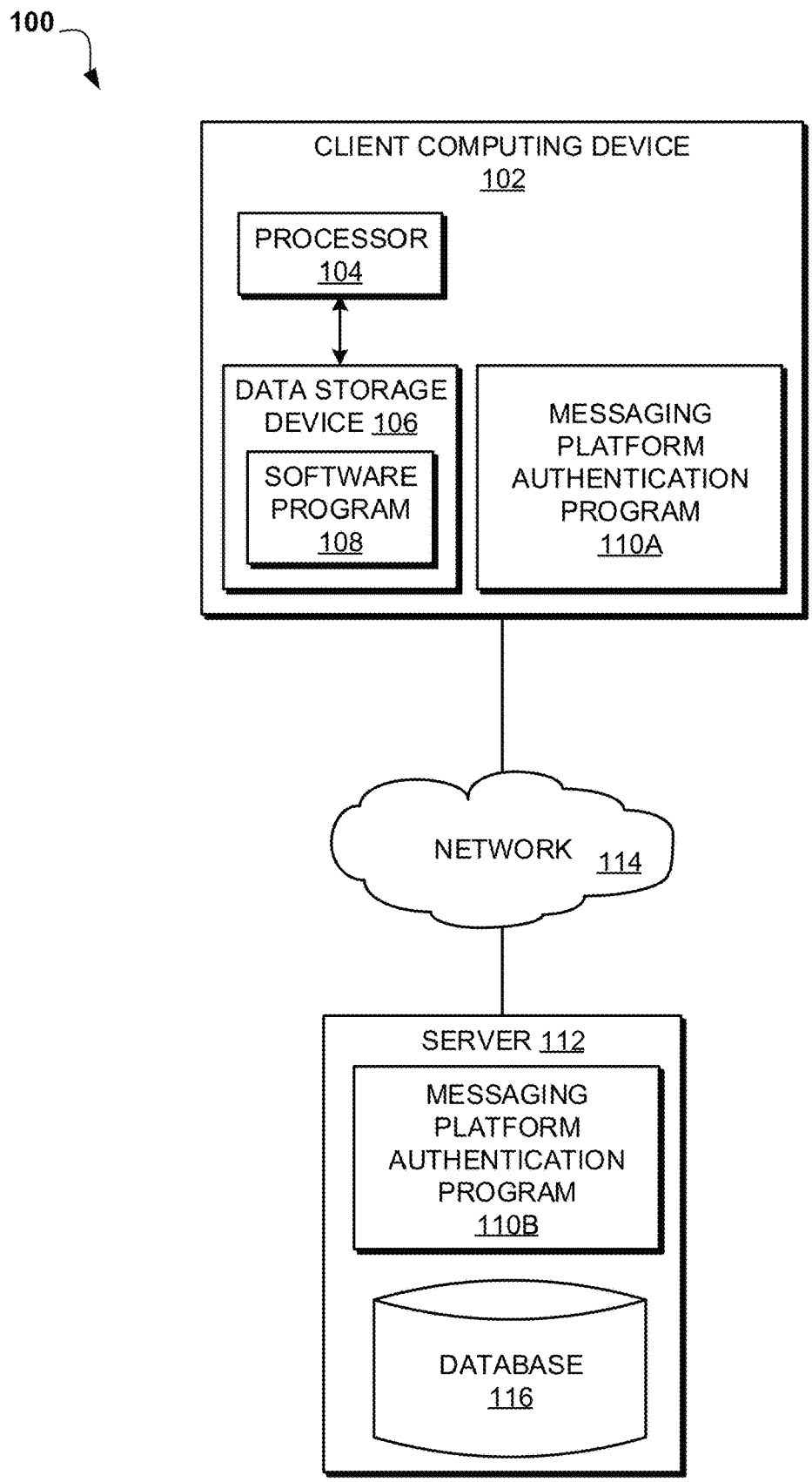
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to messaging platforms and authentication systems. The following described exemplary embodiments provide a system, method, and program product to, among other things, allow a user to navigate content that is personally directed at the user without the manual task of logging in to each website. Therefore, the present embodiment has the capacity to improve the technical field of authentication systems in messaging platforms by efficiently allowing users to access the website content personally directed at the user without having to reset the log-in information even if the user has forgotten such information. Moreover, the present embodiment may allow an unintended recipient to access promotional contents by providing a modified URL and/or modified messages even if the promotional contents were not originally directed at that recipient.

As previously described, authentication may relate to establishing the identity of a user to another user or an information system. Typically, a user identity is provided to an information system and the information system must confirm the user identity. If an authentication process is completed, a user is authorized for further actions such as making payments for purchases, editing personal information or editing important documents. A user's identity can be proved by various information such as a password, a username, an electronic signature, an email address or personal data including gender, address, and phone number, etc.

Email marketing is a method widely used by e-commerce stores and online retailers. For example, a user may receive email promotions such as 20% discount on next clothing purchases or travel fares or hotel reservations. When a user receives a promotional link to a commercial offering, the link may require the users to log in to a user account in order to grant the user access to the promotional content. However, as too many different e-commerce sites exist, and a user must remember a personal ID and password for each site, it may be difficult to recall the correct log-in information when a user tries to access the promotional content. As such, it may be advantageous to, among other things, implement a system capable of authenticating a user by ascertaining that the user is a correct recipient and possesses the correct log-in information in advance so that the user does not need to manually log in to each site. It may be also advantageous to implement a system capable of correcting unintended emails with links sent to an unintended user and preventing another user from accessing the same contents.

According to one embodiment, a messaging platform authentication program may analyze a user's electronic messages to identify user-targeted marketing links and determine whether a correct messaging ID is being used when a user opens a marketing link. In at least one other embodiment, once a messaging ID is analyzed and determined that it is the correct messaging ID, a modified URL may be sent to a user to access the user-targeted content.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to authenticate a user in messaging platforms for web contents.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a messaging platform authentication program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402*a* and external components 404*a*, respectively.

The server computer 112 may be a laptop computer, netbook computer, personal computer (PC), a desktop computer, or any programmable electronic device or any network of programmable electronic devices capable of hosting and running a messaging platform authentication program 110B and a database 116 and communicating with the client computing device 102 via the communication network 114, in accordance with embodiments of the invention. As will be discussed with reference to FIG. 4, the server computer 112 may include internal components 402*b* and external components 404*b*, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the messaging platform authentication program 110A, 110B may be a program capable of analyzing a user's electronic messages to identify user-targeted marketing links and determining whether a correct messaging ID is being used when a user opens a marketing link. Once a messaging ID is analyzed and determined to be the correct messaging ID, the messaging platform authentication program 110A, 110B may send a modified URL to allow a user to access the user-targeted contents. The messaging platform authentication process is explained in further detail below with respect to FIG. 2.

Figure 2:
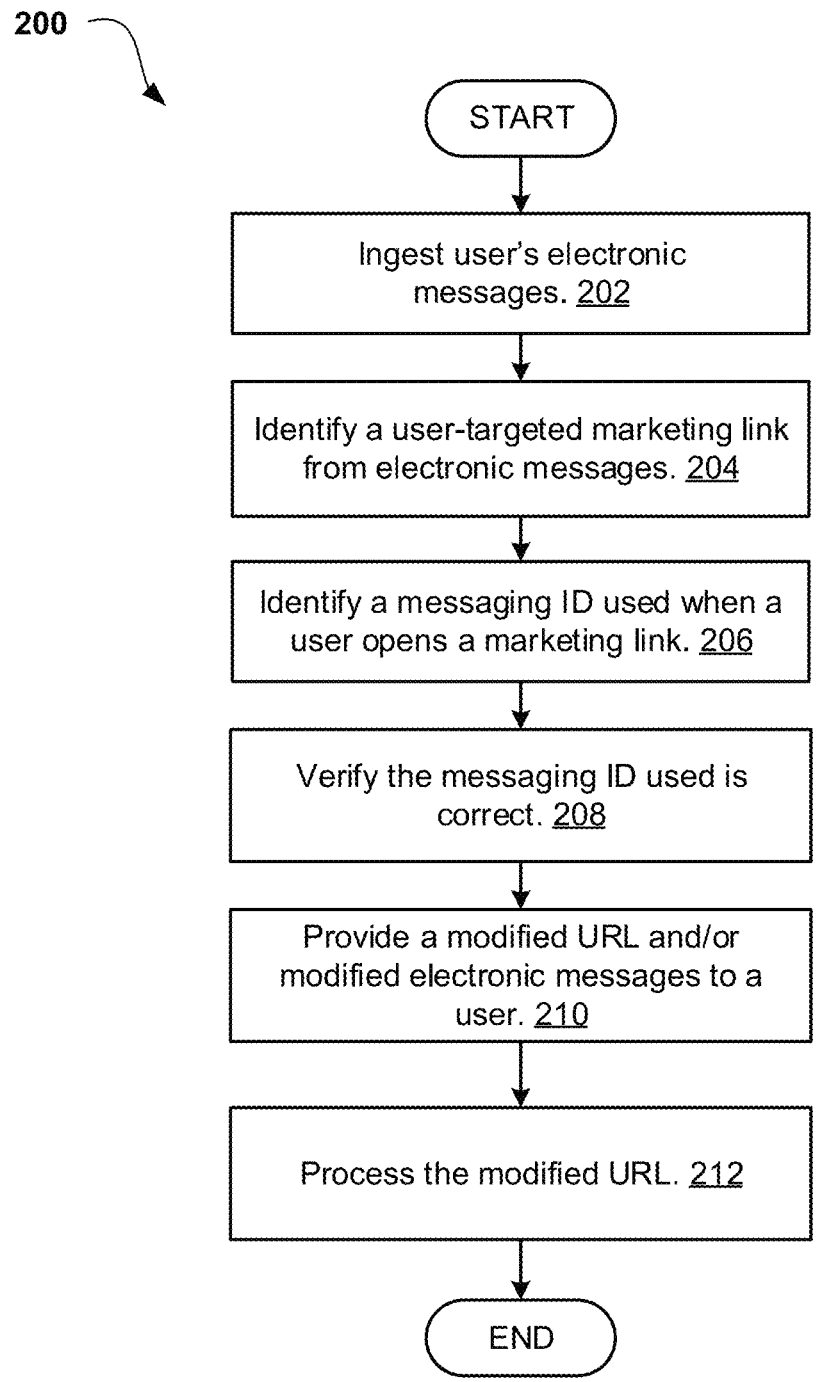
FIG. 2 is an operational flowchart illustrating a messaging platform authentication process according to at least one embodiment.

FIG. 2 is an operational flowchart illustrating a messaging platform authentication process 200 according to at least one embodiment. At 202, the messaging platform authentication program 110A, 110B receives a user's electronic messages, such as emails and instant messages from a user device. For example, a user may receive dozens of different emails or text messages containing promotional contents from e-commerce sites or online retailers. The number of emails or text messages a user receives depends on the number of e-commerce sites with which the user has signed up. For example, if a user dined at a steakhouse chain, and signed up for a membership card or account so that the user may receive a discount offer at the user's next visit. Those coupons are generally sent to a user via email or text messages based on the information the user provided to a retailer. According to one embodiment, the messaging platform authentication program 110A, 110B may ingest all of the user emails and text messages from user devices and store them for further analysis.

At 204, the messaging platform authentication program 110A, 110B analyzes and identifies user-targeted marketing links from electronic messages. For example, the messaging platform authentication program 110A, 110B may scan a large number of emails almost simultaneously, or simultaneously, and identify the emails containing the header, such as "Limited Time Card Member Exclusive 10% off", "Say Hi to your $25", or "It's $5 Chicken Sandwich Time!". According to one embodiment, the messaging platform authentication program 110A, 110B may further scan user emails and determine if the emails with promotional headers have been specifically directed at the user. For example, the email with a header "It's $5 Chicken Sandwich Time!" may have been sent randomly to a large number of people regardless of their affiliation or membership status. The messaging platform authentication program 110A, 110B may scan the "To" field in the emails and determine whether the name of the intended recipient matches the information found in the body of the email. For example, if John Doe is the named recipient in the "To" field of the email, but the body field of the email states "Dear Ms. Daniel", the messaging platform authentication program 110A, 110B then may recognize this email as an untargeted generic email and exclude it from a group of emails for further analysis.

At 206, the messaging platform authentication program 110A, 110B identifies a messaging ID that is being used when a user clicks a marketing link. For example, if a user opens an email containing promotional information regarding a future hotel booking with a certain discount offer and clicks on the link provided by a hotel site, the messaging platform authentication program 110A, 110B may scan the messaging ID that a user is using. For example, if a user uses a johndoe@xyz.com account when opening a promotional email, then the messaging platform authentication program 110A, 110B may identify johndoe@xyz.com as a user messaging ID and may further scan and identify a corresponding user account or ID that has been registered with a particular e-commerce site. In at least one embodiment, the messaging platform authentication program 110A, 110B may identify a messaging ID and corresponding user information based on a phone number to which a promotional text message has been sent.

At 208, the messaging platform authentication program 110A, 110B verifies that a messaging ID associated with the user account is correct. According to at least one embodiment, the messaging platform authentication program 110A, 110B may access all other user-received electronic messages received prior to or after a targeted marketing message has arrived and identify electronic messages with executable code that has access to specific information, such as "To" fields, "Name" field, "Body" field, and "Time or Created" field. Next, the messaging platform authentication program 110A, 110B may utilize a discriminant cluster analysis to determine whether a particular criterion is met for each category. For example, if the "To" field relates to one user with probability greater than 88 percent, the messaging platform authentication program 110A, 110B may determine that the user's name or email account appeared in the "To" field is the correct messaging ID Likewise, the messaging platform authentication program 110A, 110B may determine the correct messaging ID if the "Name" or "Body" field of emails relate to one name with probability greater than 88 percent. Also, in at least one other embodiment, the messaging platform authentication program 110A, 110B may determine whether the time or date when emails were created relate to a consistent time frame with probability greater than 72 percent, and if there are less than 30 messages relating to one particular time frame, then the messaging platform authentication program 110A, 110B may determine that the probability of the false messaging ID is high.

At 210, the messaging platform authentication program 110A, 110B provides a user with a modified URL and/or an email containing a modified URL once the correct messaging ID was identified in the step 208. For example, if a user originally received a 10% discount offer via email and the messaging platform authentication program 110A, 110B has determined that the correct user account information has been identified and it matches the information of the originally targeted recipient, then the messaging platform authentication program 110A, 110B may modify the originally provided URL by changing a personalized token at the end of the URL. The modified URL may then be loaded into a new page on a user's web browser. In the alternative, a modified URL may be provided to a user on a separate email.

Next at 212, the messaging platform authentication program 110A, 110B processes a modified URL. For example, if a user with a correct ID clicks on a modified URL, the messaging platform authentication program 110A, 110B may process the modified URL and allows the user to access promotional web content without the user having to log in to websites associated with the promotional content. According to at least one other embodiment, the messaging platform authentication program 110A, 110B may deny access to promotional content if there is no match between user information and a modified URL. In at least one other embodiment, the messaging platform authentication program 110A, 110B may require a user-side identification layer for a modified URL to work so that the messaging platform authentication program 110A, 110B may determine that the messaging platform a user is currently using matches the originally targeted recipient's platform. If a user does not authorize the identification layer to occur on the user's end, the modified URL will not work.

Figure 3:
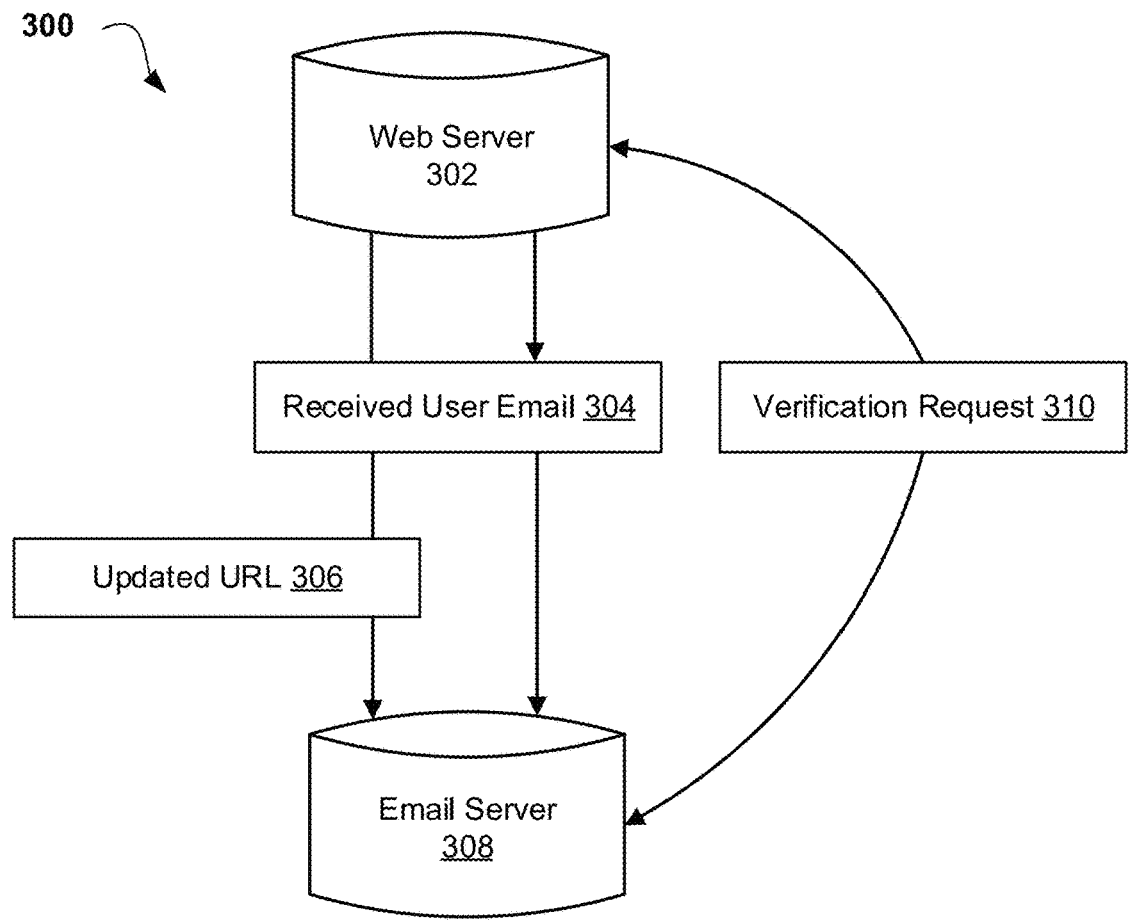
FIG. 3 is a functional block diagram of a messaging authentication platform according to at least one embodiment.

Referring now to FIG. 3, functional block diagram of a messaging platform authentication platform 300 is depicted according to at least one embodiment. The messaging platform authentication program 110A,110B may receive emails from Web Server 302 and identify emails 304 that contain promotional contents. The messaging platform authentication program 110A then determines whether a user's messaging ID matches the information associated with the originally targeted emails. Once the messaging platform authentication program 110A determines that the information matches the ID information of the originally targeted emails, the messaging platform authentication program 110A modifies the URL and sends an updated URL 306 to Email Server 308. The messaging platform authentication program 110B may then interact with Email Server 308 and Web Server 302 to process Verification Request 310 by requesting a user to validate that the platform the user is currently using matches the platform of the promotional emails. If a user validates the platform, Web Server 302 sends an updated URL and/or emails to a user.

It may be appreciated that FIGS. 2-3 provide only an illustration of one implementation and do not imply any limitations with regard to how different embodiments may be implemented. Many modifications to the depicted environments may be made based on design and implementation requirements. For example, in at least one embodiment, the messaging platform authentication program 110A, 110B may determine whether a targeted link is being accessed by an alternate user as opposed to a targeted recipient. Also, in at least one other embodiment, the messaging platform authentication program 110A, 110B may operate to allow read access for restricted emails or files that are shared with other people via emails.

Figure 4:
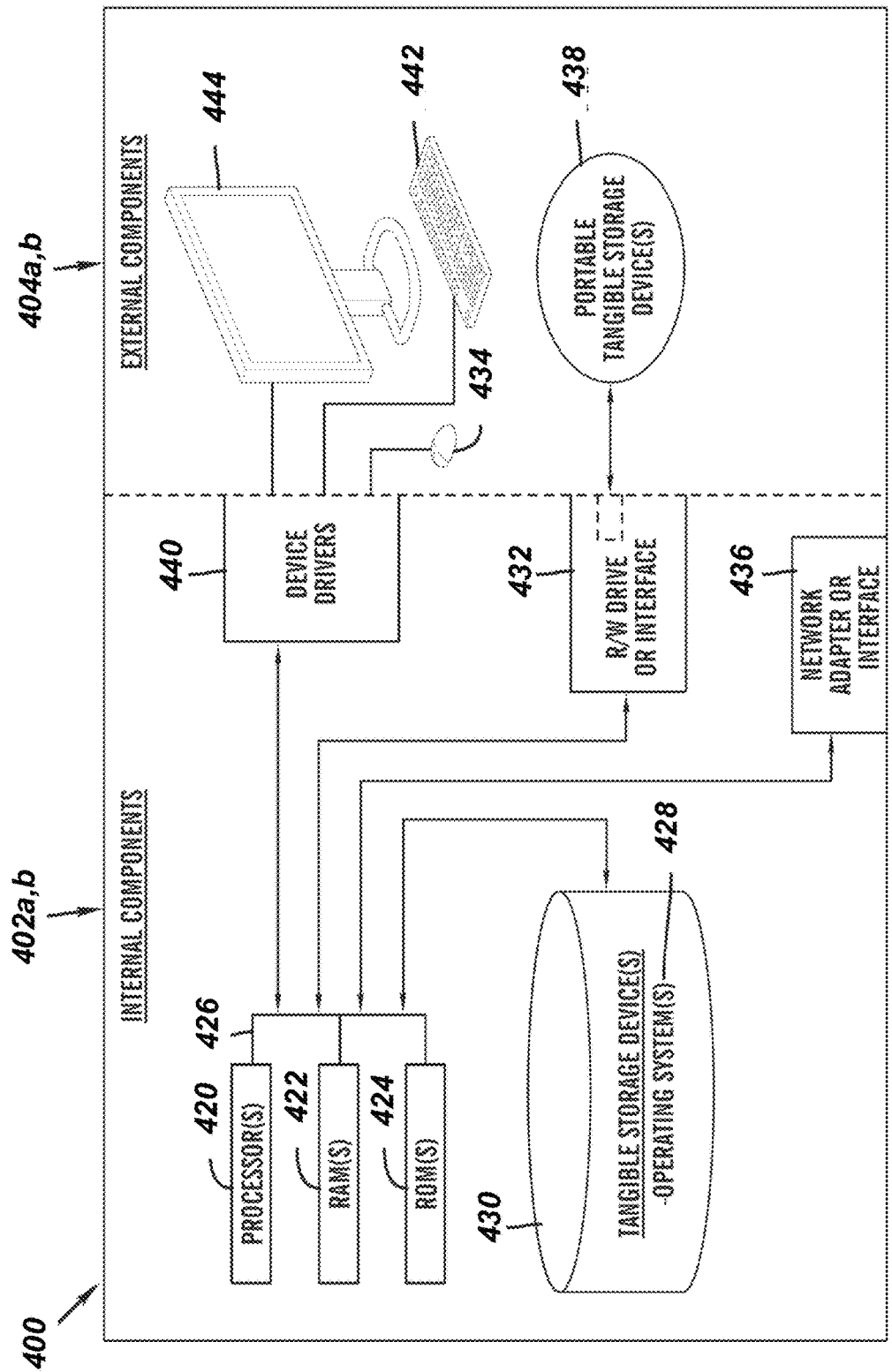
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the messaging platform authentication program 110A in the client computing device 102 and the messaging platform authentication program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes an R/W drive or interface 432 to read from and write to one or more portable computer-readable tangible storage devices

438 such as a CD-ROM, DVD, memory stick, magnetic tape, magnetic disk, optical disk or semiconductor storage device. A software program, such as the messaging platform authentication program 110A, 110B, can be stored on one or more of the respective portable computer-readable tangible storage devices 438, read via the respective R/W drive or interface 432 and loaded into the respective hard drive 430.

Each set of internal components 402 *a,b* also includes network adapters or interfaces 436 such as a TCP/IP adapter cards, wireless Wi-Fi interface cards, or 3G or 4G wireless interface cards or other wired or wireless communication links. The software program 108 and the messaging platform authentication program 110A in the client computing device 102 and the messaging platform authentication program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the messaging platform authentication program 110A in the client computing device 102 and the messaging platform authentication program 110B in the server 112 are loaded into the respective hard drive 430. The network may comprise copper wires, optical fibers, wireless transmission, routers, firewalls, switches, gateway computers and/or edge servers.

Each of the sets of external components 404 *a,b* can include a computer display monitor 444, a keyboard 442, and a computer mouse 434. External components 404 *a,b* can also include touch screens, virtual keyboards, touch pads, pointing devices, and other human interface devices. Each of the sets of internal components 402 *a,b* also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
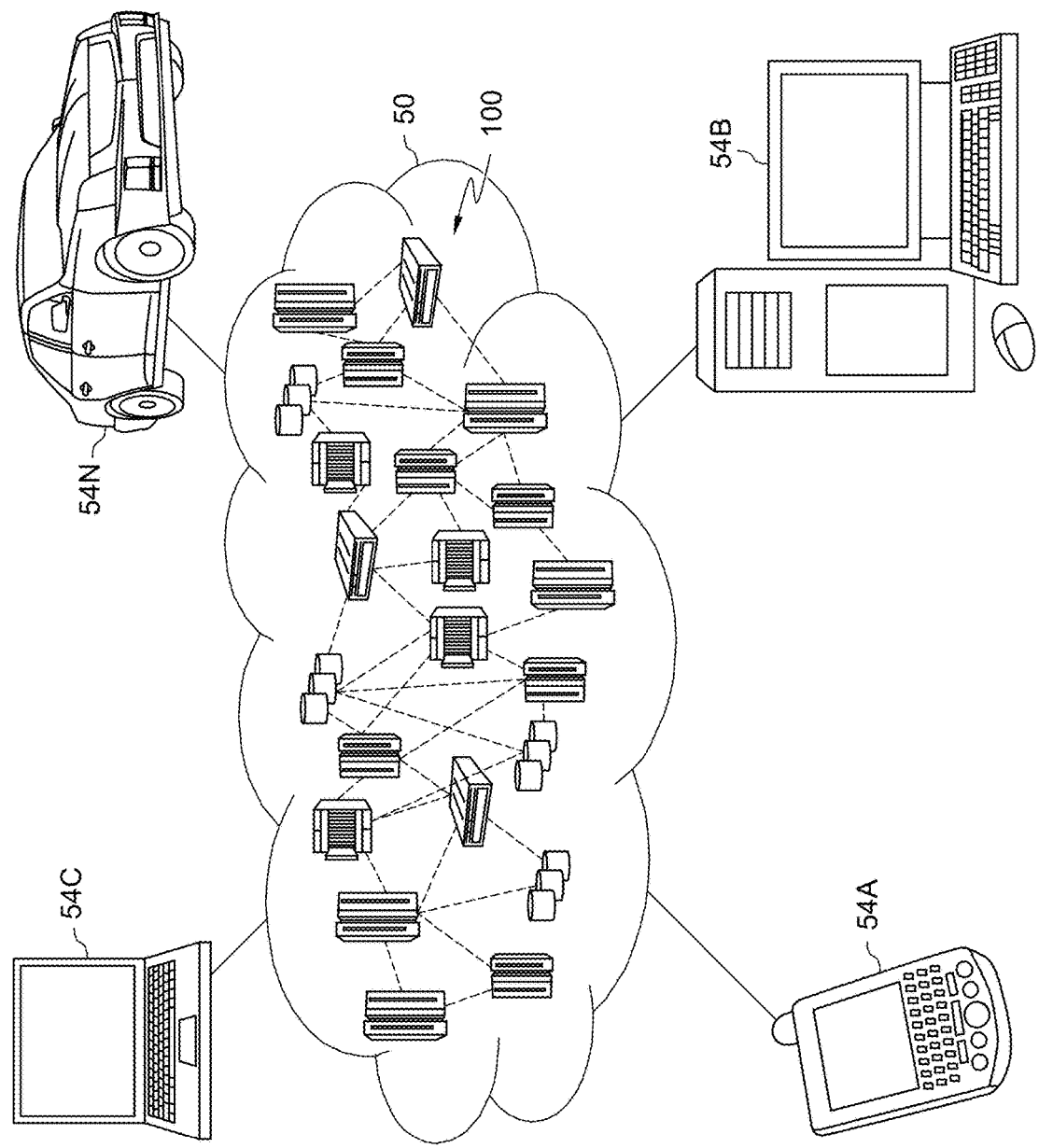
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
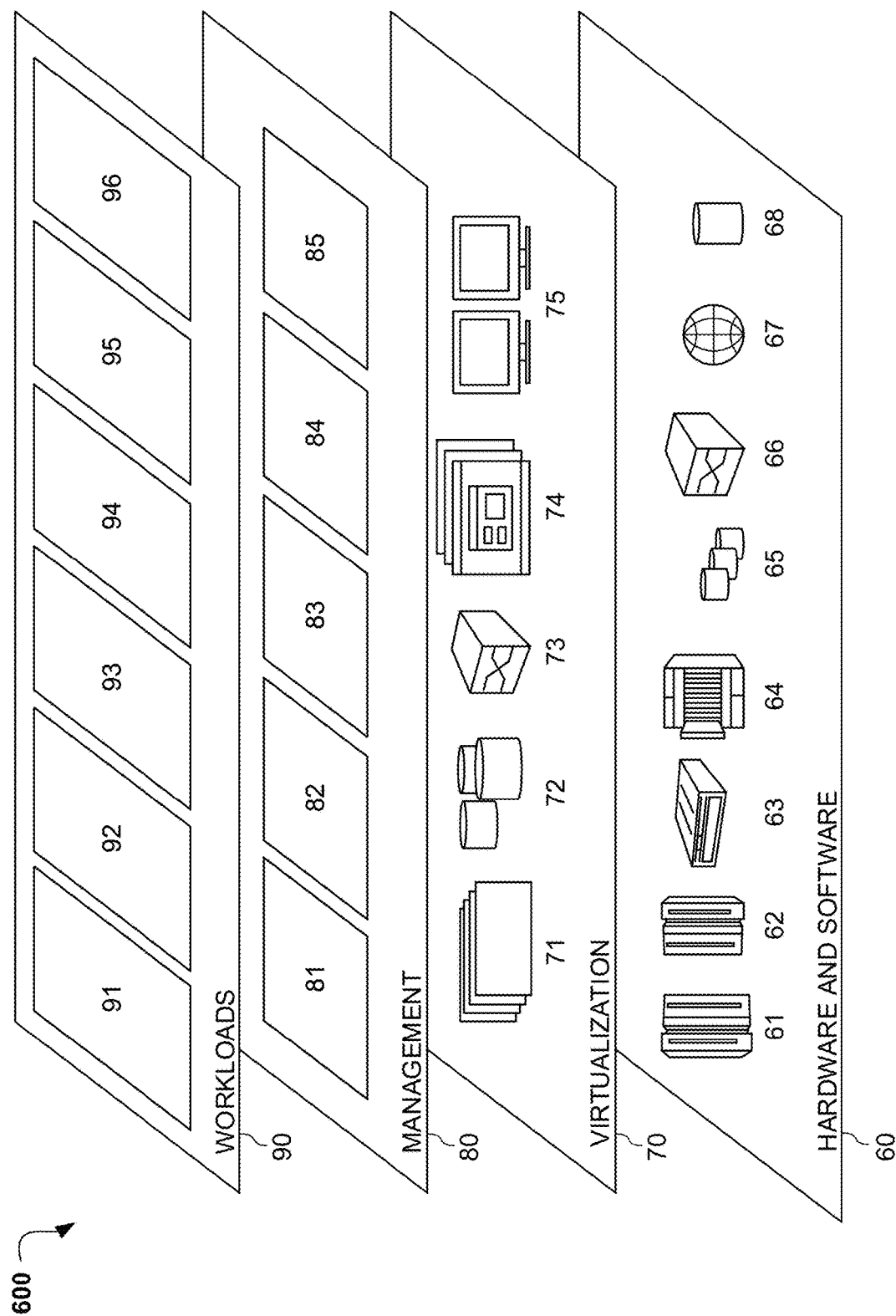
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and messaging platform authentication 96. Messaging platform authentication 96 may relate generating a database of correct messaging IDs that a user uses, monitoring various databases, email servers or a user device such as a mobile phone for electronic messages containing promotional contents or links so that messaging platform authentication 96 may determine correct messaging IDs at which promotional messages are directed.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for authenticating a user in messaging platforms for web content, the method comprising:

ingesting, by a processor, a plurality of electronic messages from a user account;

identifying a user-targeted marketing link within the plurality of electronic messages;

identifying a messaging ID associated with the user account when the user clicks the identified user-targeted marketing link with a uniform resource locator (URL);

verifying the messaging ID associated with the user is correct based on the plurality of electronic messages by analyzing specific information related to a "To" field, a "Name" field, a "Body" field or a "Time" field of the electronic messages;

in response to verifying the messaging ID associated with the user is correct, modifying one of the plurality of electronic messages by appending a personalized token to the URL;

transmitting the modified electronic message to the electronic mailbox associated with the user that includes the personalized token in the URL; and in response to user interaction with the URL, processing the URL to provide access to promotional content without the user having to log in to websites associated with the promotional content.

2. The method of claim 1, further comprising:

identifying an electronic message containing executable code that has access to specific information discovered in electronic messages.

3. The method of claim 2, further comprising:

determining whether each specific information field relates to a particular name or a time frame with a probability greater than a preconfigured percentage.

4. The method of claim 1, wherein the modified electronic message comprises generating a new electronic message that includes the URL with the personalized token.

5. The method of claim 1, further comprising:

providing read access to files shared via other user's emails or electronic messages with restrictions.

6. The method of claim 1, further comprising:
requiring a user-side identification layer for a modified URL to be processed; and
determining whether a user-side platform matches a sender's original messaging platform.

7. The method of claim 1, wherein a URL is modified by changing a personalized token at an end of the URL and loaded into a new page on a user's web browser.

8. A computer system for authenticating a user in messaging platforms for web content, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
ingesting, by a processor, a plurality of electronic messages from a user account;
identifying a user-targeted marketing link within the plurality of electronic messages;
identifying a messaging ID associated with the user account when the user clicks the identified user-targeted marketing link with a uniform resource locator (URL);
verifying the messaging ID associated with the user is correct based on the plurality of electronic messages by analyzing specific information related to a "To" field, a "Name" field, a "Body" field or a "Time" field of the electronic messages;
in response to verifying the messaging ID associated with the user is correct, modifying one of the plurality of electronic messages by appending a personalized token to the URL;
transmitting the modified electronic message to the electronic mailbox associated with the user that includes the personalized token in the URL; and
in response to user interaction with the URL, processing the URL to provide access to promotional content without the user having to log in to websites associated with the promotional content.

9. The computer system of claim 8, further comprising:
identifying an electronic message containing executable code that has access to specific information discovered in electronic messages.

10. The computer system of claim 9, further comprising:
determining whether each specific information field relates to a particular name or a time frame with a probability greater than a preconfigured percentage.

11. The computer system of claim 8, wherein the modified electronic message comprises generating a new electronic message that includes the URL with the personalized token.

12. The computer system of claim 8, further comprising: providing read access to files shared via other user's emails or electronic messages with restrictions.

13. The computer system of claim 8, further comprising:
requiring a user-side identification layer for a modified URL to be processed; and
determining whether a user-side platform matches a sender's original messaging platform.

14. The computer system of claim 8, wherein a URL is modified by changing a personalized token at an end of the URL and loaded into a new page on a user's web browser.

15. A computer program product for authenticating a user in messaging platforms for web content, the computer program product comprising:
one or more computer-readable tangible storage media and program instructions stored on at least one of the one or more tangible storage media, the program instructions executable by a processor of a computer to perform a method, the method comprising:
ingesting, by a processor, a plurality of electronic messages from a user account;
identifying a user-targeted marketing link within the plurality of electronic messages;
identifying a messaging ID associated with the user account when the user clicks the identified user-targeted marketing link with a uniform resource locator (URL);
verifying the messaging ID associated with the user is correct based on the plurality of electronic messages by analyzing specific information related to a "To" field, a "Name" field, a "Body" field or a "Time" field of the electronic messages;
in response to verifying the messaging ID associated with the user is correct, modifying one of the plurality of electronic messages by appending a personalized token to the URL;
transmitting the modified electronic message to the electronic mailbox associated with the user that includes the personalized token in the URL; and
in response to user interaction with the URL, processing the URL to provide access to promotional content without the user having to log in to websites associated with the promotional content.

16. The computer program product of claim 15, further comprising:
identifying an electronic message containing executable code that has access to specific information discovered in electronic messages.

17. The computer program product of claim 16, further comprising:
determining whether each specific information field relates to a particular name or a time frame with a probability greater than a preconfigured percentage.

18. The computer program product of claim 15, wherein the modified electronic message comprises generating a new electronic message that includes the URL with the personalized token.

19. The computer program product of claim 15, further comprising:
providing read access to files shared via other user's emails or electronic messages with restrictions.

20. The computer program product of claim 15, further comprising:
requiring a user-side identification layer for a modified URL to be processed; and
determining whether a user-side platform matches a sender's original messaging platform.

* * * * *